United States Patent
Shefferman et al.

(10) Patent No.: US 10,872,100 B1
(45) Date of Patent: *Dec. 22, 2020

(54) VERIFYING THE VALIDITY AND STATUS OF DATA FROM DISPARATE SOURCES

(71) Applicant: Trulia, LLC, Seattle, WA (US)

(72) Inventors: David Shefferman, San Francisco, CA (US); Alex Parr, San Francisco, CA (US)

(73) Assignee: Trulia, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,333

(22) Filed: Aug. 13, 2018

Related U.S. Application Data (63) Continuation of application No. 13/245,584, filed on Sep. 26, 2011, now Pat. No. 10,078,679.

(60) Provisional application No. 61/386,800, filed on Sep. 27, 2010.

(51) Int. Cl.
*G06F 16/27* (2019.01)

(52) U.S. Cl.
CPC ................... *G06F 16/273* (2019.01)

(58) Field of Classification Search
None
See application file for complete search history.

(56) References Cited

U.S. PATENT DOCUMENTS

| | | |
|---|---|---|
| 8,108,271 B1 | 1/2012 | Dunca |
| 8,255,418 B2 | 8/2012 | Fuhry |
| 8,595,186 B1 | 11/2013 | Mandyam |
| 9,361,583 B1 | 6/2016 | Holloway |
| 2003/0187759 A1 | 10/2003 | Arthus |
| 2004/0138912 A1 | 7/2004 | Campbell |
| 2004/0193952 A1 | 9/2004 | Narayanan |
| 2005/0192930 A1 | 9/2005 | Hightower |
| 2005/0289196 A1* | 12/2005 | Starbuck ............... G06F 16/273 |
| 2006/0212416 A1 | 9/2006 | Taylor |
| 2006/0247944 A1* | 11/2006 | Calusinski, Jr. ....... G06Q 40/00 705/1.1 |
| 2007/0133947 A1 | 6/2007 | Armitage |
| 2008/0172393 A1 | 7/2008 | Baird |
| 2008/0244008 A1 | 10/2008 | Wilkinson |
| 2009/0006490 A1 | 1/2009 | Hunt et al. |
| 2009/0187575 A1* | 7/2009 | DaCosta ................. G06Q 30/06 |
| 2009/0307050 A1* | 12/2009 | Fournier ................ G06Q 30/02 705/313 |

(Continued)

OTHER PUBLICATIONS

Akata, et al., "Good Practice in Large-Scale Learning for Image Classification," Retrieved from the internet on Jun. 3, 2015 <http://hal.inria.fr/docs/00/83/58/10/PDF/TPAMI_minor_revision.pdf> 15 pages.

(Continued)

*Primary Examiner* — Thu N Nguyen
(74) *Attorney, Agent, or Firm* — Perkins Coie LLP (57) ABSTRACT

Resolving a discrepancy between disparate data sources is disclosed. Listing data for an item for sale is received from a plurality of disparate data sources. The listing data is compared with reliable listing data from a reliable data source. It is determined whether there is a discrepancy between the listing data and the reliable listing data. In the event there is a discrepancy between the listing data and the reliable listing data, at least a portion of the listing data is filtered.

20 Claims, 8 Drawing Sheets

(56) References Cited

U.S. PATENT DOCUMENTS

| | | |
|---|---|---|
| 2011/0071924 A1 | 3/2011 | Desmond |
| 2011/0107301 A1 | 5/2011 | Chan |
| 2013/0041949 A1 | 2/2013 | Biesecker |
| 2016/0027051 A1 | 1/2016 | Gross |
| 2016/0132946 A1 | 5/2016 | Bate |

OTHER PUBLICATIONS

Crammer et al., "Online Passive-Aggressive Algorithms." Retrieved from the internet on Jun. 3, 2015 <http://jmir.org/papers/volume7/crammer06a/crammer06a.pdf> 35 pages.

Cuda-convnet. High-performance C++/CUDA implementation of convolutional neural networks. Retrieved from the internet on Jun. 3, 2015 <https://code.google.com/p/cuda-convnet/> 3 pages.

Cuzzocrea, A. et al., "A multi-view multi-dimensional ensemble learning approach to mining business process deviances." 2016 International Joint Conference on Neural Networks (IJCNN) Year: 2016 pp. 3809-3816.

Final Office Action in U.S. Appl. No. 13/245,584, dated Apr. 10, 2017, 27 pages.

Final Office Action in U.S. Appl. No. 13/245,584, dated Feb. 6, 2015, 26 pages.

Final Office Action in U.S. Appl. No. 13/245,584, dated Jul. 9, 2013, 23 pages.

FLANN-Fast Library for Approximate Nearest Neighbors. Retrieved from the internet on Jun. 3, 2015 <http://www.cs.ubc.ca/research/flann/> 2 pages.

Garcia, N., et al., "ANN+GIS: An automated system for property valuation", Neurocomputing, vol. 71, 2008, pp. 733-742.

Girshick, et al., "Rich feature hierarchies for accurate object detection and semantic segmentation." Retrieved from the internet on Jun. 3, 2015 <http://www.cs.berkeley.edu/~rbg/papers/r-cnn-cvpr.pdf> pp. 1-21.

GitHub, BVLC/Caffe. Retrieved from the internet on Jun. 3, 2015 <https://github.com/BVLC/caffe/blob/master/LICENSE> 1 page.

Gong, R., et al., "A Kolmogorov-Smirnov statistic based segmentation approach to learning from imbalanced datasets: With application in property refinance prediction", Expert Systems with Applications: An International Journal, vol. 39, Issue 6, May 2012, pp. 6192-6200.

Huang, S., et al., "Topological pattern discovery and feature extraction for fraudulent financial reporting", Expert Systems with Applications: An International Journal, vol. 41, Issue 9, Jul. 2014, pp. 4360-4372.

Huang, S.Y. et al., "The prediction approach with Growing Hierarchical Self-Organizing Map." 2012 International Joint Conference on Neural Networks (IJCNN) Year: 2012 pp. 1-7.

Hur, J., et al., "A hybrid classification method using error pattern modeling", Expert Systems with Applications, vol. 34, 2008, pp. 231-241.

ImageNet. Retrieved from the internet on Jun. 3, 2015 <http://www.image-net.org/> 1 page.

Jia, Yangqing, et al. "Caffe: Convolutional architecture for fast feature embedding." *Proceedings of the ACM international Conference on Multimedia*. ACM, 2014, 4 pages.

Lazebnik, et al., "Beyond Bags of Features: Spatial Pyramid Matching for Recognizing Natural Scene Categories ." Retrieved from the internet on Jun. 3, 2015 <http://www-cvr.ai.uiuc.edu/ponce_grp/publication/paper/cvpr06b.pdf> 8 pages.

Lowe, et al., "Distinctive Image Features from Scale-Invariant Keypoints," International Journal of Computer Vision, 60(2), 2004, pp. 91-110.

Non-Final Office Action in U.S. Appl. No. 13/245,584, dated Jul. 18, 2016, 26 pages.

Non-Final Office Action in U.S. Appl. No. 13/245,584, dated Jul. 8, 2014, 20 pages.

Non-Final Office Action in U.S. Appl. No. 13/245,584, dated Nov. 27, 2012, 22 pages.

Non-Final Office Action in U.S. Appl. No. 13/245,584, dated Nov. 5, 2015, 26 pages.

Non-Final Office Action in U.S. Appl. No. 13/245,584, dated Oct. 5, 2017, 27 pages.

Non-Final Office Action in U.S. Appl. No. 14/325,078, dated Mar. 6, 2017, 14 pages.

Non-Final Office Action in U.S. Appl. No. 14/558,390, dated Jan. 3, 2017, 17 pages.

Notice of Allowance in U.S. Appl. No. 14/558,390, dated Dec. 6, 2017, 6 pages.

Notice of Allowance in Notice of Allowance in U.S. Appl. No. 14/558,390, dated Feb. 28, 2018, 6 pages.

Notice of Allowance in U.S. Appl. No. 13/245,584, dated Jun. 4, 2018, 8 pages.

Ojala, et al., "Multiresolution Gray-Scale and Rotation Invariant Texture Classification with Local Binary Patterns." Retrieved from the internet on Jun. 3, 2015 <http://www.outex.oulu.fi/publications/pami_02_opm.pdf>, pp. 1-35.

Opencv. Retrieved from the internet on Jun. 3, 2015 <http://opencv.org/> 3 pages.

Perronnin, et al., "Improving the Fisher Kernel for Large-Scale Classification." Retrieved from the internet on Jun. 3, 2015 <https://lear.inrialpes.fr/pubs/2010/PSM10/PSM10_0766.pdf> 14 pages.

Prasad, C. et al., "Prediction of authorship using various classification algorithms." 2017 International Conference on Advances in Computing, Communications and Informatics (ICACCI) Year: 2017 pp. 1671-1676.

Python. Pyleargist 1.0.1. Retrieved from the Internet on Jun. 3, 2015 <https://pypi.python.org/pypi/pyleargist/1.0.1> 2 pages.

Scikit-image. Image processing in python. Retrieved from the internet on Jun. 3. 2015 <http://scikit-image.org> 2 pages.

Scikit-learn. Machine Learning in Python. Retrieved from the internet on Jun. 3, 2015 <http://scikit-learn.org/stable/> 3 pages.

Siagian, et al., "Rapid Biologically-inspired Scene Classification Using Features Shared with Visual Attention," IEEE Transactions on Pattern Analysis and Machine Intelligence, Feb. 2007, pp. 1-19.

Theano, Retrieved from the internet on Jun. 3, 2015 <http://deeplearning.net/software/theano/> 3 pages.

Tola, et al., "DAISY: An Efficient Dense Descriptor Applied to Wide Baseline Stereo," Ecole Polytechnique Federale de Lausanne, Jun. 14, 2009, pp. 1-31.

Van de Sande et al., "Evaluation of Color Descriptors for Object and Scene Recognition." Retrieved from the internet on Jun. 3, 2015 <https://staff.fnwi.uva.nl/k.e.a.vandesande/pub/vandesande-cypr2008.pdf> 8 pages.

Vanhoenshoven, F. et al., "Detecting malicious URLs using machine learning techniques." 2016 IEEE Symposium Series on Computational Intelligence (SSCI) Year: 2016 pp. 1-8.

Zhou, et al., "Image Classification using Super-Vector Coding of Local Image Descriptors." Retrieved from the internet on Jun. 3, 2015 <http://stat.rutgers.edu/home/tzhang/papers/eccv10_supervect.pdf>, pp. 1-14.

U.S. Appl. No. 13/245,584 for Shefferman, filed Sep. 26, 2011.

U.S. Appl. No. 14/325,078 for Rawat, filed Jul. 7, 2014.

U.S. Appl. No. 14/558,390 for Kong, filed Dec. 2, 2014.

Notice of Allowance in U.S. Patent Application No. 14/325,078, mailing date May 20, 2019, 11 pp.

U.S. Appl. No. 16/588,622 for Rawat et al., filed Sep. 30, 2019.

\* cited by examiner

STEP 1:
Trulia receives data from
ListingAggregator.com

STEP 2:
Price error is detected from a participating
MLSs Trulia Direct Reference file

STEP 3:
Trulia corrects the price discrepancy
per the MLS reference file and
provides attribution to the MLS

STEP 4:
If error persists, Agent/Broker/MLS are
notified of the data mismatch STEP 5: Sources of bad data are reported to the MLS on a listing level
and MLSs can empower their members to stop the distribution
of bad data at the source!

FIG. 5

Greetings,
This is a courtesy email to inform you of listing data discrepancies identified by Trulia. MLSListings is participating in Trulia Direct Reference, a program to verify and validate listing data received through 3rd party sources. According to the MLS, the data provided to Trulia by the following source(s) is incorrect. Please review the conflicts below. As a reminder, you can always view all of your current listings on Trulia.

Please note, Trulia is currently displaying what we believe to be correct information as provided by the MLS. We recommend contacting the listing sources below to correct or remove the errors. If, for some reason, Trulia is using inaccurate data from MLSListings, please let us know by mailing fixmylisting@trulia.com.

123 Main Street, San Francisco

| Source | Error Type | Source Value | MLS Value | |
|---|---|---|---|---|
| VirtualTour.com | Price | $429,000 | $399,000 | View Source |
| Postlets | Status | For Sale | Withdrawn | View Source |

VERIFYING THE VALIDITY AND STATUS OF DATA FROM DISPARATE SOURCES

CROSS REFERENCE TO OTHER APPLICATIONS

This application is a continuation of U.S. patent application Ser. No. 13/245,584 entitled VERIFYING THE VALIDITY AND STATUS OF DATA FROM DISPARATE SOURCES, filed Sep. 26, 2011, which claims priority to U.S. Provisional Patent Application No. 61/386,800 entitled VERIFYING THE VALIDITY AND STATUS OF DATA FROM DISPARATE SOURCES, filed Sep. 27, 2010, both of which are incorporated herein by reference in their entireties for all purposes.

BACKGROUND OF THE INVENTION

Individuals or organizations may have one or more items that they would like to offer for sale. In some cases, these items are high value and/or one of a kind items, such as real estate. These items may be listed on various websites that list items for sale. Over time, information about the item may change (e.g., the price may drop if the item does not sell in a given period), but not all of the websites may contain the latest data. As a result, there is a need for improvement in handling listing data associated with multiple disparate data sources.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
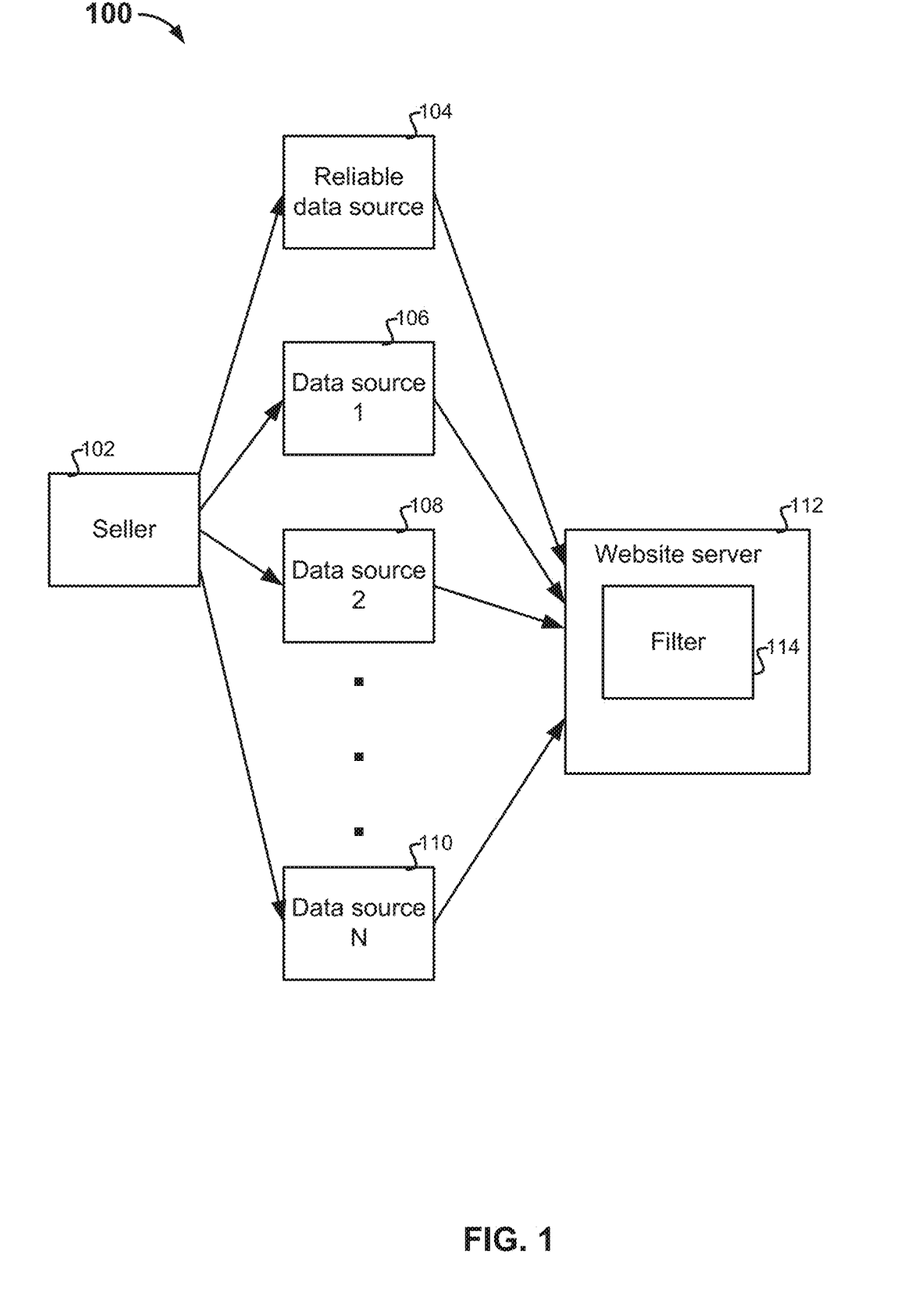
FIG. 1 is a block diagram illustrating an embodiment of a system for resolving a discrepancy between disparate data sources.

FIG. 1 is a block diagram illustrating an embodiment of a system for resolving a discrepancy between disparate data sources. In the example shown, system 100 is shown to include: seller 102, reliable data source 104, data sources 106-110, website 112, and filter 114 in website 112. Seller 102 is an individual or organization interested in selling an item(s). Seller 102 may opt to provide listing data to multiple disparate data sources 106-110. Each of data sources 106-110 is independent of each other. For example, each of data sources 106-110 may be a separate website that stores its own version of the listing data for the item for sale. In some embodiments, and in the examples herein, listing data for a particular item comprises fields having field values. For example, the fields may include: name, description, price, etc., and the values for those fields are stored by each data source.

In some embodiments, seller 102 is not included. For example, reliable data source 104 may be a known reliable data source and data sources 106-110 may be alternate data sources with a facsimile or copies of the data, which may or may not be in sync with the known reliable data source.

The listing data for each data source may include one or more fields in common. For example, data source 108 may store the following listing data for an item: name, description, and price. Data source 110 may store the following listing data for the same item: name, image, and price. Website 112 obtains data from each of data sources 106-110 and attempts to resolve any discrepancies between the data, before displaying the listing data. For example, website 112 may be a website that provides real estate listing data to potential home buyers or some other publisher of listing data. In some embodiments, the discrepancies are resolved by filter 114 in website 112 based at least in part on reliable data source 104. For example, if, for an item, data source 108 shows $10, data source 110 shows $8, and reliable data source 104 shows $8, then filter 114 would output $8 and website 112 would provide or display $8 for the price in the listing data. Potential buyers can then go to website 112 to view reliable data. For example, website 112 might display the name, description, image, and price ($8).

Filter 114 is configured in a variety of ways in various embodiments. In some embodiments, filter 114 resolves discrepancies based at least in part on a reliable data source 104, as described above. In some embodiments, filter 114 resolves discrepancies based at least in part on an indication of reliability (e.g., a reliability rating or ranking) of each of data sources 106-110, which may be particularly useful in the absence of reliable data source 104 or in the event reliable data from reliable data source 104 is not available. For example, reliable data source 104 may include a name and price but not a description or image. If there is a discrepancy between descriptions, then filter 114 determines which data source has a better reliability rating and then uses the description from that data source. In some embodiments, the indication of reliability may be based on which data source has more field values that match those of reliable data source 104. The indication of reliability may be prestored and updated at a regular interval, such as every 24 hours. Further examples and details of filter 114 and associated processes are further described below.

Figure 2:
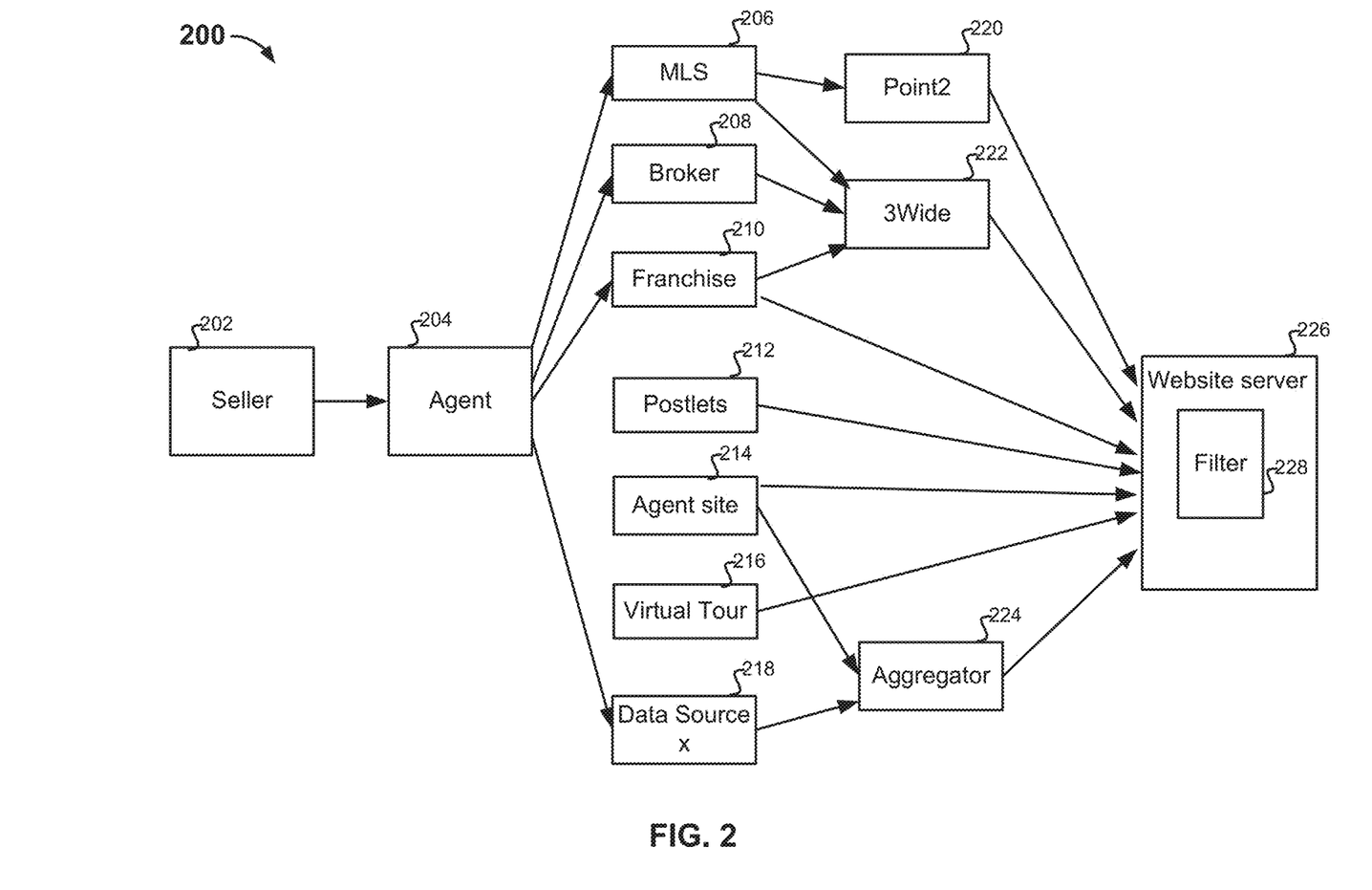
FIG. 2 is a block diagram illustrating an embodiment of a system for resolving a discrepancy between disparate data sources of real estate listing data.

FIG. 2 is a block diagram illustrating an embodiment of a system for resolving a discrepancy between disparate data sources of real estate listing data. In the example shown, system 200 is shown to include: seller 202, agent 204, reliable data source 206, data sources 208-224, website 226, and filter 228 in website 226. Seller 202 is an individual or organization interested in selling real estate and using agent 204. Agent 204 may opt to provide listing data to multiple disparate data sources 206-218. Each of data sources 206-218 is independent of each other. For example, each of data sources 206-218 may be a separate website that stores its own version of the listing data for the item for sale. Each of data sources 220-224 obtains and/or aggregates listing data from one or more of data sources 206-218.

Examples of fields for listing data include: Multiple Listing Service (MLS) ID, street address, status, price, open house date(s), etc. Although this and other examples herein describe real estate, in various embodiments, the items for sale may be associated with any type of item for sale, such as vehicles (e.g., automobiles, aircraft, boats), hobbies/collectibles (e.g., art, jewelry), businesses (e.g., ice cream shop or website), etc. In some embodiments, the item may be offered for sale based at least in part on an auction (e.g., eBay).

Most real estate agents belong to a Multiple Listing Service (MLS) for their local geographical region. The MLS acts as the system of record, and agents have a legal responsibility to keep that information up-to-date and current. Thus, in this example, MLS 206 houses the most reliable (e.g., up-to-date) information regarding property listings.

In various embodiments, the reliable data source exports the data in an electronic format and/or provides credentials to log in to their system and pull the reliable data directly from the reliable data source (e.g., the MLS system).

In addition to MLSs, agents often input listing data into other sources (e.g., data sources 208-218): broker/franchise systems, Postlets, Vflyer, agent sites, virtual tour sites, etc. These systems are not necessarily updated as diligently, often causing discrepancies in data for the same listing.

Data sources 220-224 include other aggregators and data sources that re-distribute MLS and other data. Data sources 220-224 each have different processing times, so, for example, a change at MLS 206, which comes through a third party feed such as data source 220, may take an extra day or longer to be reflected in that third-party's feed, which, in turn takes an additional day for a publisher (website server 226) to process. Examples of data sources 220-224 include: Point2 and 3Wide.

As a result of all these disparate sources, data exchange schedules, processing schedules, and sometimes outdated/stale information, it is very difficult to truly know the actual status of a listing.

In some embodiments, filter 228 uses listing data from a reliable data source, such as MLS 206 to filter/unfilter the inventory (e.g., listing data) from data sources 208-224 to ensure that the most accurate, reliable, and/or updated data possible is displayed by website 226.

Figure 3:
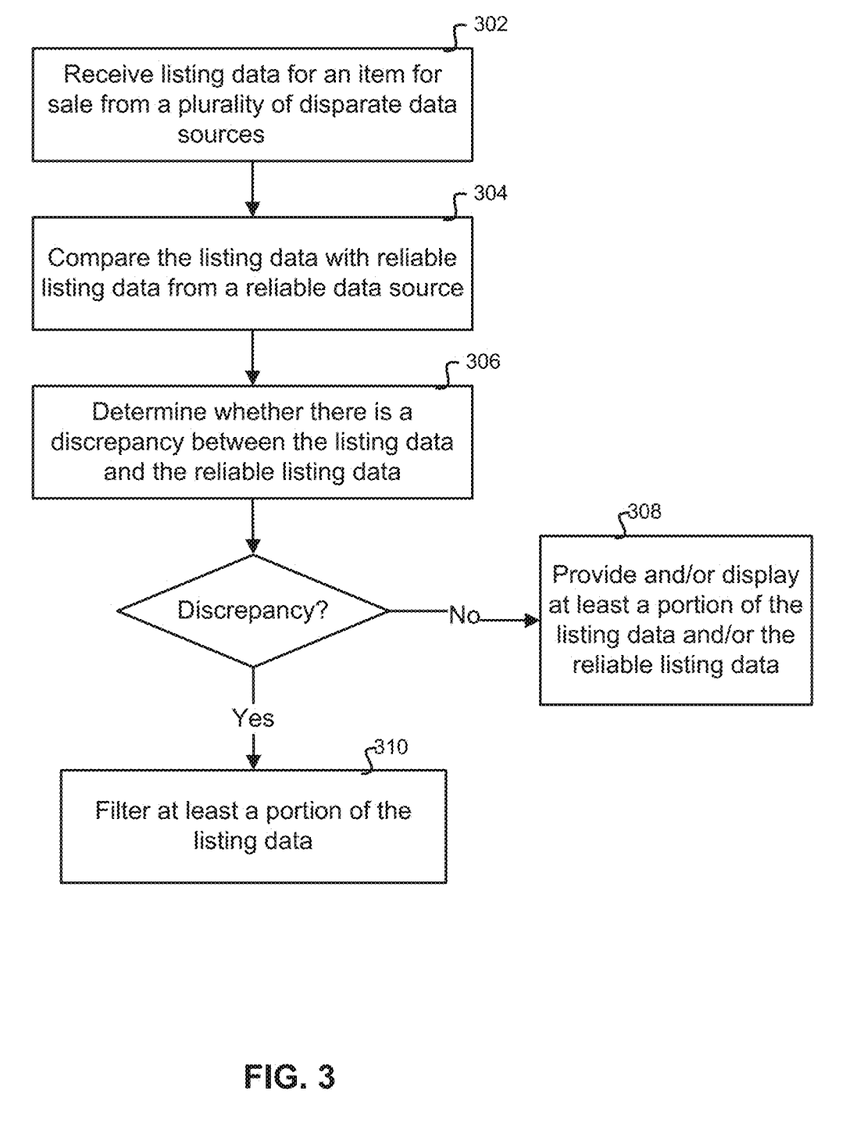
FIG. 3 is a flow chart diagram illustrating an embodiment of a process for resolving a discrepancy between disparate data sources using filtering.

FIG. 3 is a flow chart diagram illustrating an embodiment of a process for resolving a discrepancy between disparate data sources using filtering. In some embodiments, this process is performed by filter 228 of website (server) 226.

At 302, listing data for an item for sale is received from a plurality of disparate data sources of listing data. Examples of items for sale include real estate property, automobiles, etc. Examples of data sources include: data sources 206-224, a broker, franchise, Postlets, agent site, virtual tour (site), Point2, 3Wide, any aggregator of multiple data sources, or any agent tool.

At 304, the listing data is compared with reliable listing data from a reliable data source. An example of a reliable data source includes MLS 206.

At 306, it is determined whether there is a discrepancy between the listing data and the reliable listing data. For example, the listing data for a particular item may include a plurality of fields. One or more of those field values may not match between the listing data and the reliable listing data.

The listing data fields and the reliable listing data fields may not be identical, but in most cases, they have at least one field in common. For example, the listing data from a virtual tour site may include values for: address, price, listing date, and open house date(s). The listing data for the reliable listing data may include values for: address, price, and status. The common fields in this example are address and price.

Examples of fields included in the listing data fields and/or the reliable listing data fields include: mlsid (MLS ID), listing type (e.g., resale, foreclosure, new home, rental, etc.), property type (e.g., single family, multiple family, commercial), unit number, street address, city, zip code, county, state, parcel id, price, number bedrooms, number full bathrooms, number half bathrooms, number bathrooms, year built, living area square feet, lot size, plan id, brokerage name, broker name, brokerage id, brokerage mls code, agent name, agent phone, agent email, agent id, date listed, date sold, open house date(s), open house time(s), status (e.g., for rent, for sale, pending, active contingent, sold, withdrawn, etc.), and status change date.

In the event it is determined that there is not a discrepancy between the listing data and the reliable listing data, then at 308, at least a portion of the listing data and/or the reliable listing data is provided and/or displayed.

In the event it is determined that there is a discrepancy between the listing data and the reliable listing data, then at 310, at least a portion of the listing data is filtered. In some embodiments, filtering is performed by filter 228. Filtering may include replacing the listing data with the reliable listing data. In some embodiments, filtering may include replacing only the conflicting field values of the listing data with those of the reliable listing data. In some cases, filtering includes providing and/or displaying both the listing data and the reliable listing data, in addition to an indication of the conflict and/or which fields conflict. For example, the indication may include an annotation of the name and/or date of the data source providing the listing data, and the name and/or date of the reliable data source, so that a viewer of the website may have all the data points. The date may comprise one or more of: the listing date (or date on which the listing was created), the date the listing data was last updated, or the date the listing data was received by an aggregator (e.g., 220-224) or by website (e.g., 226). In some embodiments, the conflicting data is highlighted.

In some embodiments, rather than assume the reliable data source always provides reliable data, any one or more of the aforementioned dates may be used to verify that the reliable data source is reliable. For example, the MLS listing date may be compared with the date the other listing is received (to ensure the MLS listing is not an old listing for the same property). If the MLS listing date is later than the date the other listing is received, then the data from reliable data source is considered reliable. If the MLS listing date is earlier than the date the other listing is received, then the data from the reliable data source is not considered reliable, at least for this listing, and the other listing (i.e., the listing having conflicting data to the MLS data) may be considered more reliable and used to provide data on the website.

In some embodiments, how the listing data is filtered is dependent on which fields have conflicts. For example, if the status field (e.g., For sale, Active Contingent, Pending, Withdrawn, Sold) conflicts, then the entire reliable listing may replace the entire other listing.

If there is a discrepancy in price, the price field is corrected with the price provided by the reliable data source, the agent is notified of the discrepancy (e.g., including a request that they verify the correct price), and the data provider is notified that their data conflicts with that of a reliable data source (e.g., MLS data).

If there is a discrepancy among open home dates/times, the agent associated with the listing is notified of the discrepancy (e.g., including a request that they verify the correct information). Until the agent verifies and/or corrects the open house dates/times, the open house dates/times provided by the MLS may be displayed with an indication that there may be a conflict and to verify this information with the agent. The data provider may also be notified that their data conflicts with MLS data.

In various embodiments, a variety of features are configurable by the reliable data source (e.g., the MLS). For example, the MLS may configure how to handle discrepancies (e.g., whether to highlight discrepancies, replace field values, or replace entire listings) and/or whether and how to provide a notification of the discrepancy (e.g., step 4 of FIG. 5). For example, whether to provide notifications everytime the agent logs into the MLS, etc.

Figure 4:
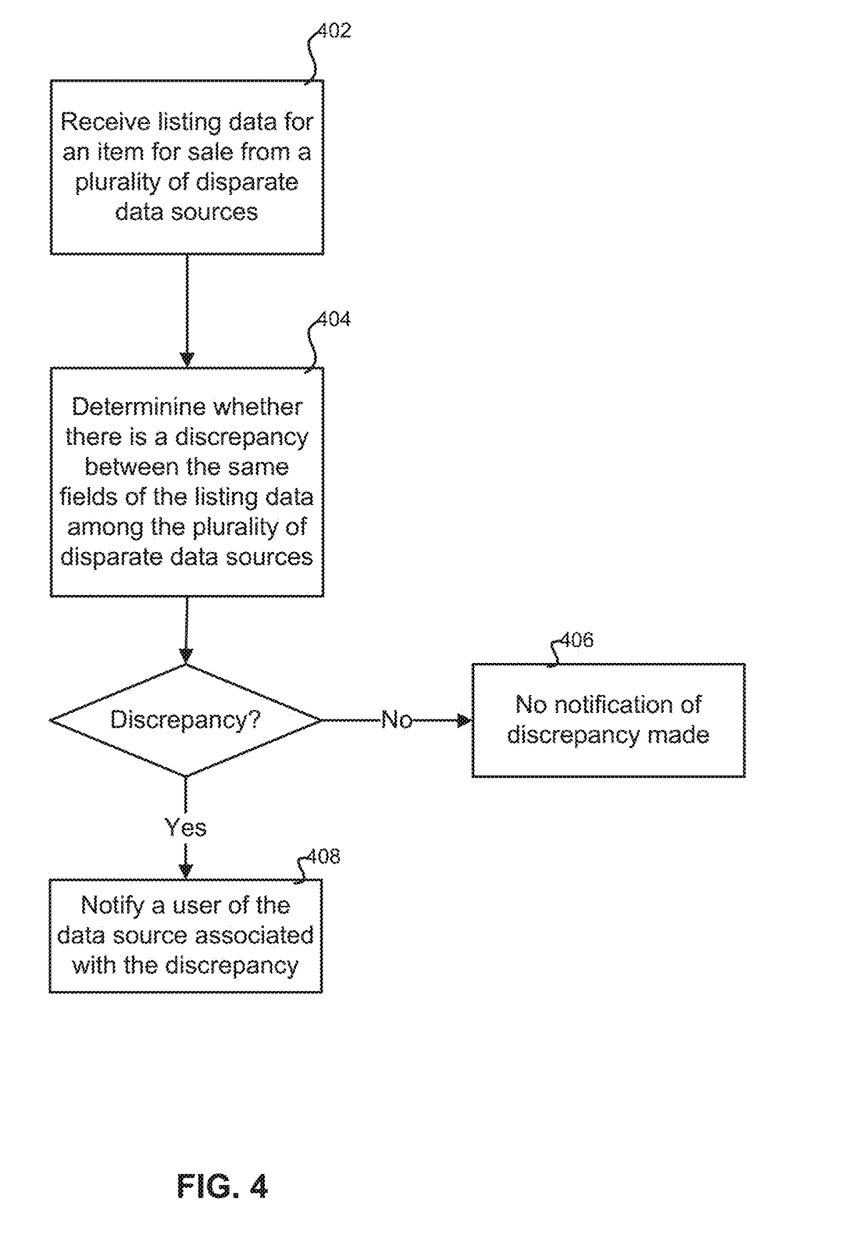
FIG. 4 is a flow chart diagram illustrating an embodiment of a process for notifying a user of a discrepancy between disparate data sources.

FIG. 4 is a flow chart diagram illustrating an embodiment of a process for notifying a user of a discrepancy between disparate data sources. In some embodiments, this process is performed by website (server) 226. In some embodiments, at least a portion of this process is performed in conjunction with FIG. 3. For example, step 408 is performed after or in parallel to step 310.

At 402, listing data for an item for sale is received from a plurality of disparate data sources.

At 404, it is determined whether there is a discrepancy between the same fields of the listing data among the plurality of disparate data sources.

In the event it is determined there is not a discrepancy, then at 406, no notification of a discrepancy is made.

In the event it is determined there is a discrepancy, then at 408, a user of the data source associated with the discrepancy is notified. A user may include the seller, an agent, a (e.g., feed) provider of the listing, an aggregator of multiple listings, the data source, etc.

For example, the agent and/or a feed provider associated with a listing may be emailed or otherwise provided information regarding the discrepancy. In some embodiments, a mechanism to confirm or decline the MLS-provided information is provided.

Figure 5:
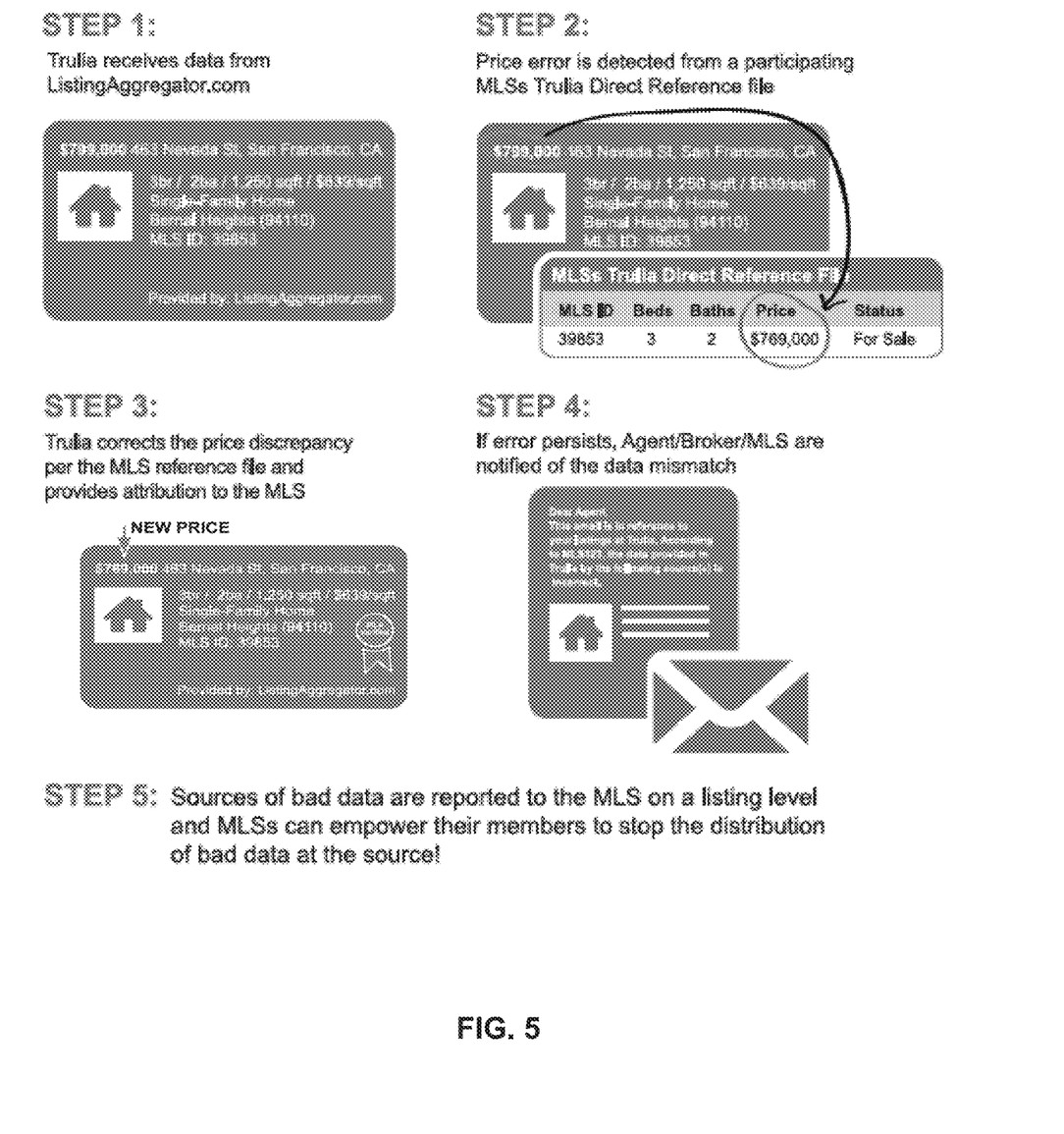
FIG. 5 is a diagram illustrating a specific example of resolving a discrepancy between disparate data sources and also notifying a user of a discrepancy between disparate data sources.

FIG. 5 is a diagram illustrating a specific example of resolving a discrepancy between disparate data sources and also notifying a user of a discrepancy between disparate data sources. In some embodiments, this process is performed by website (server) 226. In this example, Trulia (www.trulia.com) is website 226.

At step 1, Trulia receives listing data for a real estate property from ListingAggregator.com, a data source. Trulia displays the listing data and attributes the listing data to ListingAggregator.com as shown.

At step 2, Trulia detects a conflict in the price field of the listing data based on listing data from a reliable data source, in this case, a participating MLS. In this example, the participating MLS preformats a file in a prespecified way to create a Trulia Direct Reference File, which is then provided to Trulia, e.g., through a feed. The price from ListingAggregator.com is $799,000, and the price from the MLS's Trulia Direct Reference file is $769,000.

In some embodiments, the listing data from the reliable data source (e.g., Trulia Direct Reference File) only includes a subset of all the fields that the reliable data source stores. For example, of all the fields that may be stored by the MLS for a property listing, the Trulia Direct Reference File may only include fields for: MLSID, price, status, and open house dates and times.

At step 3, Trulia corrects the price discrepancy using the MLS reference file and may provide attribution to the MLS. By providing attribution to the MLS, the MLS gets credit for those changes and validates the MLS to users of Trulia. In various embodiments, whether to provide attribution is a configurable option.

At step 4, it is determined whether a certain period of time (e.g., 4 days) has elapsed and whether the listing data of ListingAggregator.com is incorrect. If both are true, then a user (e.g., the agent, broker, or MLS) is notified of the mismatch. Having the lag time allows time for data sources (e.g., feed providers) to get updated data to Trulia.

At step 5, the MLS is able to compile sources of bad/outdated listing data and report back to MLS members.

Figure 6:
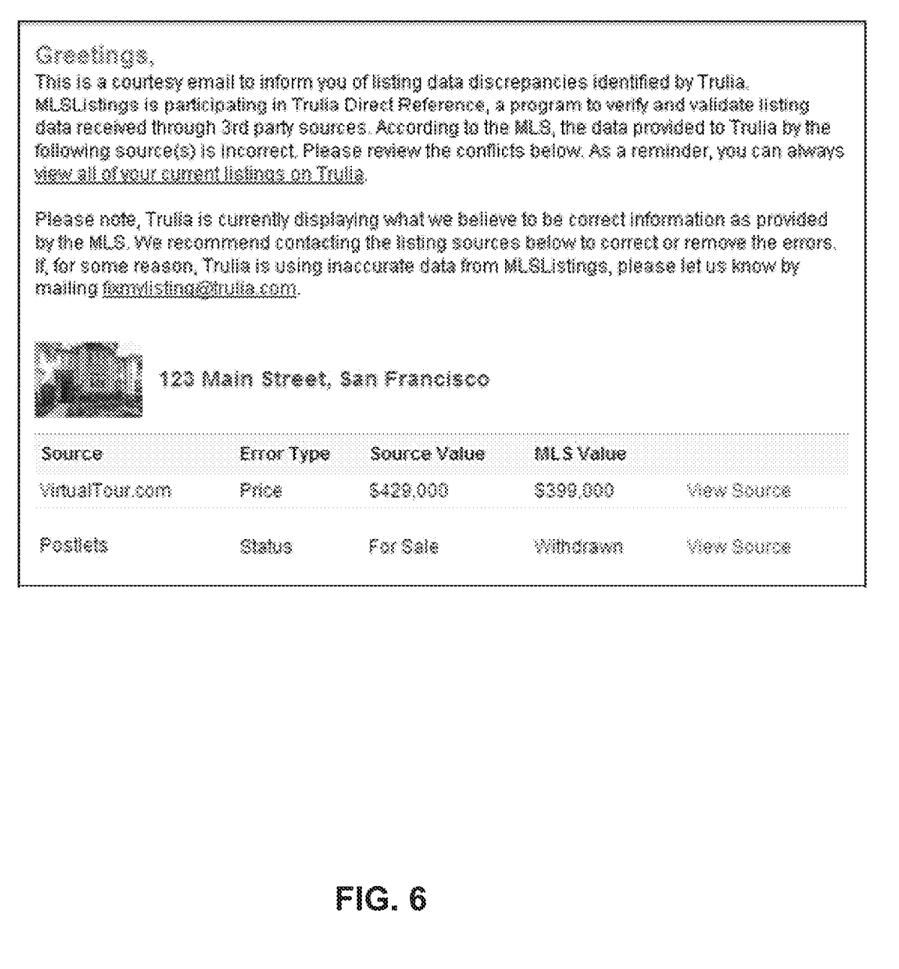
FIG. 6 is a diagram illustrating a specific example of a notification of a discrepancy between disparate data sources.

FIG. 6 is a diagram illustrating a specific example of a notification of a discrepancy between disparate data sources. In some embodiments, this notification is provided at step 4 of FIG. 5 or at 408.

As shown in this example, the data sources (VirtualTour.com and Postlets) for which data discrepancies have been found compared to a reliable source (MLS) are indicated, in addition to the error type (the Price and Status fields), and the values of these fields according to the data sources and the reliable source. In addition, a link to view the data sources is provided.

Such an interface may be provided via email or other means (e.g., a window that opens when the user logs into the MLS website).

Figure 7:
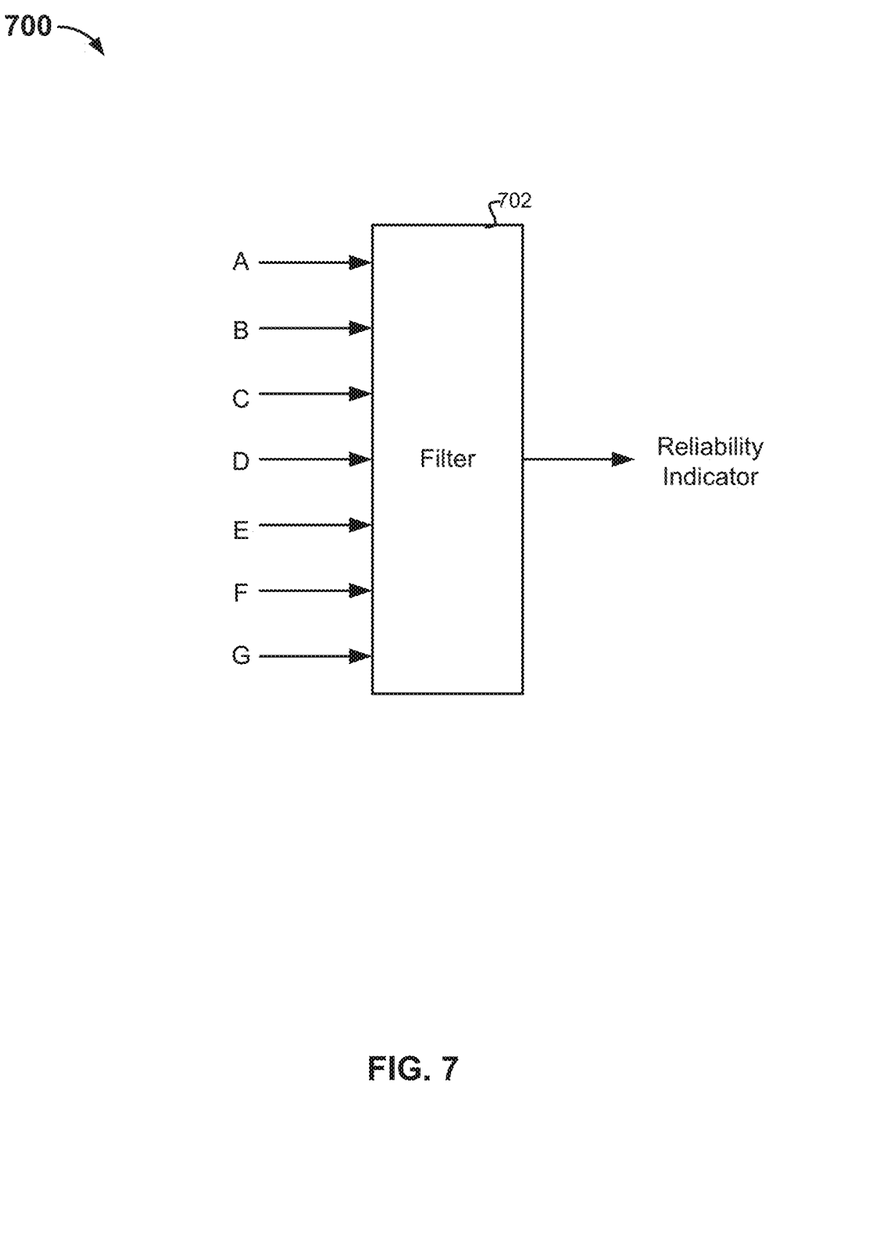
FIG. 7 is a diagram illustrating an embodiment of a system for adjusting an indication of reliability of a data source.

FIG. 7 is a diagram illustrating an embodiment of a system for adjusting an indication of reliability of a data source. In this example, system 700 is shown to include disparate data sources A-G, one or more of which may be a reliable data source. Filter 702 may be a part of filter 228 or may be separate. In this example, filter 702 is used to rank the reliability of data sources based on the listing data obtained from the data sources and dynamically adjust the ranking as appropriate. In some embodiments, filter 702 performs the process of FIG. 8 to perform this ranking. In some embodiments, filter 702 may output some other indication of reliability of each data source, such as a reliability rating.

Figure 8:
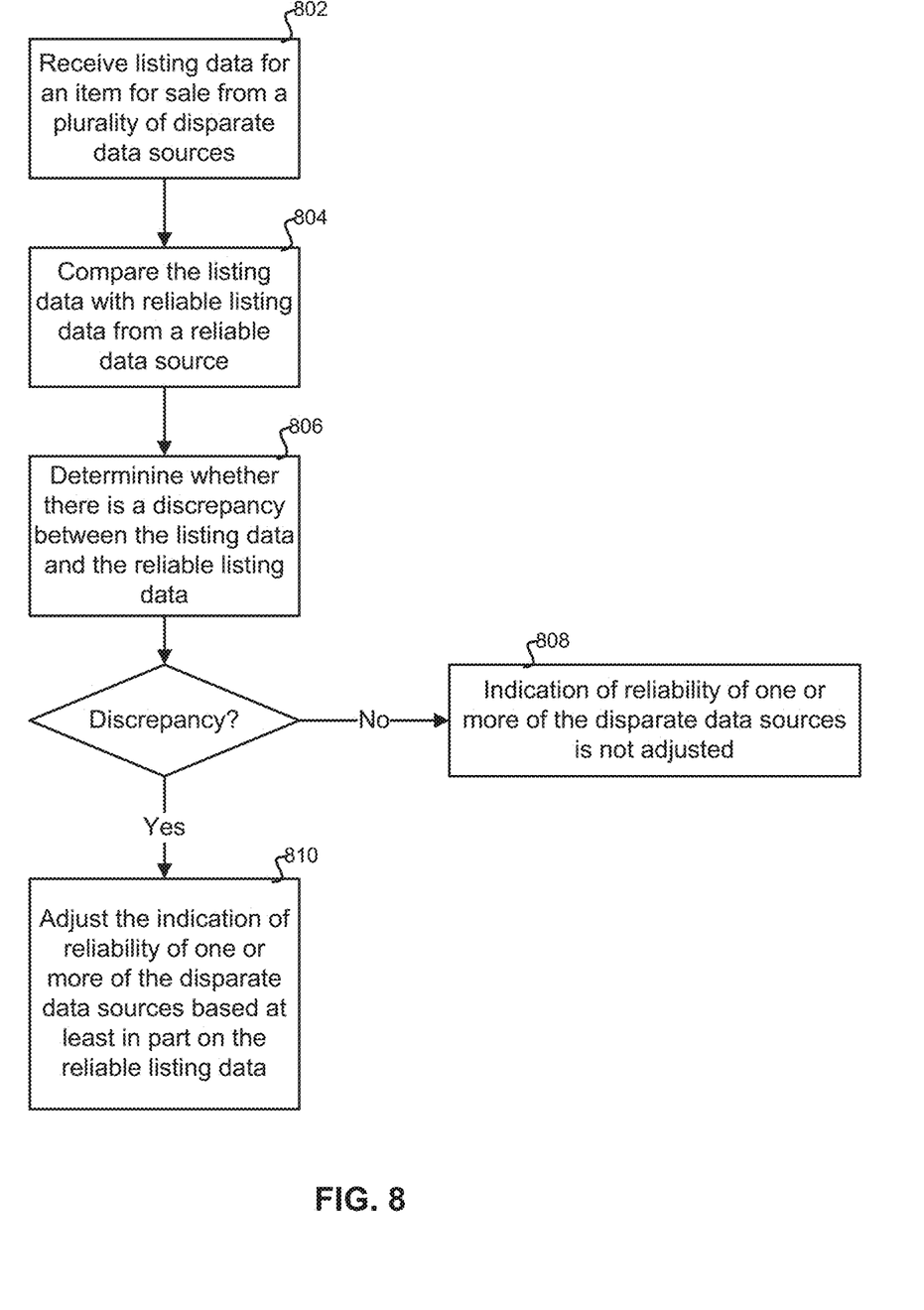
FIG. 8 is a flow chart illustrating an embodiment of a process for adjusting an indication of reliability of a data source.

FIG. 8 is a flow chart illustrating an embodiment of a process for adjusting an indication of reliability of a data source. In some embodiments, the indication of reliability is used to resolve a discrepancy among a plurality of disparate data sources in the absence of reliable listing data from a reliable data source. In some embodiments, this process is performed by website (server) 226. In some embodiments, one or more steps of this process is performed periodically, e.g., every 24 hours. In this example, the indication of reliability is dynamically adjusted (e.g., re-ordered) based on a reliable data source.

At 802, listing data for an item for sale is received from a plurality of disparate data sources. For example, referring to FIG. 7, data source A, B, C, D, E, and F may have 100,000 listings, 50,000 listings, 80,000 listings, 90,000 listings, 5000 listings, and 10,000 listings, respectively. All of those listings are received at filter 702, e.g., through feeds.

At 804, the listing data is compared with reliable listing data from a reliable data source. For example, data source F is a reliable data source, such as an MLS.

At 806, it is determined whether there is a discrepancy between the listing data and the reliable listing data. For example, A, B, C, D, and E, have 100, 250, 1000, 500, and 5 listings, respectively, in which one or more fields differ from corresponding field(s) of data source F.

In the event there is not a discrepancy between the listing data and the reliable listing data, then at 808, the indication of reliability of one or more of the disparate data sources is not adjusted, or at least not adjusted based on a discrepancy.

In the event there is a discrepancy between the listing data and the reliable listing data, then at 810, the indication of reliability of one or more of the disparate data sources is adjusted based at least in part on the reliable listing data. For example, one indication of reliability could be an accuracy rate or error rate, which may be computed for each of A, B, C, D, and E as follows:

Error rate=Number of listings with one or more fields with discrepancies/Total number of listings Accuracy rate=1−Error rate In some embodiments, the computation may be based on number of fields instead of number of listings. For example:

Error rate=Number of fields having one or more discrepancies/Total number of common fields where common fields are the fields the data source and the reliable data source have in common.

In some other embodiments, the computation may be based on a fraction (e.g., ratio or percentage) of fields in a listing that has a discrepancy. Other embodiments that indicate a proxy of data reliability projections based on actual observations across a subset of the data may be deployed.

Using the first Error rate definition as an example, the error rate for each of A, B, C, D, and E would be:

Error rate($A$)=100/100,000=0.001

Error rate($B$)=250/50,000=0.005

Error rate($C$)=1000/80,000=0.0125

Error rate($D$)=500/90,000=0.005556

Error rate($E$)=5/5000=0.001

In this example, the ranking from most reliable to least reliable would be: A or E, B, D, and then C. A and E have the same error rate so they tie. Various tie breaking techniques may be used in various embodiments. For example, in some embodiments, A is ranked before E because A has more listings (100,000). In some embodiments, E is ranked before A because E includes certain data elements such as images or video.

The ranking may then be used to resolve discrepancies. For example, if A and D have one or more fields that conflict, then the fields for A would replace the fields for D in conflict. Alternatively, the listing data from D would not be used or the listing data from A would completely replace the listing data from D.

In some embodiments, the indication of reliability is different based on the geographic region (e.g., the local MLS region). In the above example, the data from data sources A, B, C, D, E, F may be received or otherwise obtained for properties limited to a particular geographical region. Error rates would be computed and the ranking would apply only to properties within that geographical region. As such, there would be multiple rankings for a particular data source depending on the geographical region. This could be useful, for example, if in the San Francisco area, agents tended to use and update source D frequently whereas in the Los Angeles area, agents tended to rarely use and update source D, and more frequently use and update source E. For properties in San Francisco, source D might have a higher ranking than source E, and vice versa in the Los Angeles area.

In some embodiments, when a new data source is made available, that data source initially has no reliability ranking, a low reliability ranking, or the lowest reliability ranking, at least until the new data source can be ranked, e.g., according to one or more steps of FIG. 8.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for identifying and resolving discrepancies between different data sources, comprising:
   receiving from a plurality of different data sources, listing data for an item, wherein the listing data from the plurality of different data sources comprises listing data for the same item, and wherein the listing data for each data source among the plurality of data sources comprises values for one or more data fields;
   comparing values of a first set of data fields in the listing data received from a first data source among the plurality of data sources with values of the first set of data fields in the listing data received from a second data source among the plurality of data sources for the item;
   determining whether there is a discrepancy between the listing data received from the first data source and the listing data received from the second data source;

when there is a discrepancy between the listing data received from the first data source and the listing data received from the second data source, resolving the discrepancy between the listing data for the item received from the first data source and the listing data for the item received from the second data source by:

determining an indication of reliability of the first data source;

determining an indication of reliability of the second data source;

identifying a set of data fields whose values are different between the listing data received from the first data source and the listing data received from the second data source;

for each particular data field in the set of data fields whose values are different:

comparing the indication of reliability for of the first data source with the indication of reliability of the second data source;

when the indication of reliability for of the first data source is greater than the indication of reliability of the second data source, replacing a value of the particular field of the listing data for the item received from the second data source with a conflicting value of the particular data field of the listing data for the item received from the first data source; and when the indication of reliability of the second data source is greater than the indication of reliability of the first data source, replacing a value of the particular field of the listing data for the item received from the first data source with a conflicting value of the particular data field of the listing data for the item received from the second data source.

2. The method of claim 1, wherein indications of reliability of data sources of the plurality of data sources are based on reliability ratings of the data sources, wherein the reliability ratings of the data sources are determined at least in part by:

for each particular data source of at least a subset of the plurality of data sources:

processing listing data of a set of listings from the particular data source;

determining an accuracy rate for the particular data source by comparing the listing data of a subset of the set of listings from the particular data source with distinguished listing data from a distinguished data source; and ranking the data sources of the plurality of data sources based on the determined accuracy rate of each different data source.

3. The method of claim 2, wherein the set of listings are selected based on a geographic proximity of each listing in the set of listings to a geographic location of the item.

4. The method of claim 1, wherein an indication of reliability of a particular data source of the plurality of data sources is determined based at least in part on a number of listings of the particular data source that have discrepancies as compared to listings of a distinguished data source.

5. The method of claim 1, wherein an indication of reliability of a particular data source of the plurality of data sources is determined based at least in part on a number of fields in each listing of the particular data source that have discrepancies as compared to the same fields in each corresponding listing of a distinguished data source.

6. The method of claim 1, wherein an indication of reliability of a particular data source of the plurality of data sources is determined based at least in part on a geographic location of the item.

7. The method of claim 1, wherein an indication of reliability of a particular data source of the plurality of data sources is determined based at least in part on one or more attributes of the particular data source.

8. The method of claim 1, wherein an indication of reliability of a particular data source of the plurality of data sources is determined based at least in part on one or more of the following: a creation date of a listing in the particular data source, an update date of the listing in the particular data source, a receipt date of the listing in the particular data source.

9. The method of claim 1 further comprising:

comparing values of a particular set of data fields in listing data received from the particular data source with values of the particular set of data fields in corresponding listing data received from a distinguished data source; and updating an indication of reliability of the particular data source based on the comparison.

10. The method of claim 1 further comprising:

when the indication of reliability of the first data source is greater than the indication of reliability of the second data source, replacing values of all fields of the listing data for the item received from the second data source with values of the corresponding data fields of the listing data for the item received from the first data source; and when the indication of reliability of the second data source is greater than the indication of reliability of the first data source, replacing values of all fields of the listing data for the item received from the first data source with values of the corresponding data fields of the listing data for the item received from the second data source.

11. The method of claim 1 further comprising:

transmitting an indication of the discrepancy between the listing data received from the first data source and the listing data received from the second data source.

12. The method of claim 1, wherein the listing data for the is real estate listing data for the item.

13. The method of claim 1 wherein resolving the discrepancy between the listing data for the item received from the first data source and the listing data for the item received from the second data source further comprises:

for each particular data field in the set of data fields whose values are different:

determining a type of the particular data field;

when the type of the particular data field indicates replacement:

when the indication of reliability of the first data source is greater than the indication of reliability of the second data source, replacing values of all fields of the listing data for the item received from the second data source with values of the corresponding data fields of the listing data for the item received from the first data source; and when the indication of reliability of the second data source is greater than the indication of reliability of the first data source, replacing values of all fields of the listing data for the item received from the first data source with values of the corresponding data fields of the listing data for the item received from the second data source.

14. A computer program product for resolving a discrepancy between different data sources, the computer program product being embodied in a non-transitory tangible computer readable storage medium and comprising computer instructions for:
- receiving, from a plurality of different data sources, listing data for an item, wherein the listing data from the plurality of different data sources comprises listing data for the same item, and wherein the listing data for each data source among the plurality of data sources comprises values for one or more data fields;
- comparing values of a first set of data fields in the listing data received from a first data source among the plurality of data sources with values of the first set of data fields in the listing data received from a second data source among the plurality of data sources for the item;
- determining whether there is a discrepancy between the listing data received from the first data source and the listing data received from the second data source;
- when there is a discrepancy between the listing data received from the first data source and the listing data received from the second data source, resolving the discrepancy between the listing data for the item received from the first data source and the listing data for the item received from the second data source by:
  - determining an indication of reliability of the first data source;
  - determining an indication of reliability of the second data source;
  - identifying a set of data fields whose values are different between the listing data received from the first data source and the listing data received from the second data source;
  - for each particular data field in the set of data fields whose values are different:
    - comparing the indication of reliability of the first data source with the indication of reliability of the second data source;
    - when the indication of reliability of the first data source is greater than the indication of reliability of the second data source, replacing a value of the particular field of the listing data for the item received from the second data source with a conflicting value of the particular data field of the listing data for the item received from the first data source; and
    - when the indication of reliability of the second data source is greater than the indication of reliability of the first data source, replacing a value of the particular field of the listing data for the item received from the first data source with a conflicting value of the particular data field of the listing data for the item received from the second data source.

15. The computer program product of claim 14, wherein indications of reliability of data sources of the plurality of data sources are based on reliability ratings of the data sources,
wherein the reliability ratings of the data sources are determined at least in part by:
- for each particular data source of at least a subset of the plurality of data sources:
  - process listing data of a set of listings from the particular data source;
  - determine an accuracy rate for the particular data source by comparing the listing data of a subset of the set of listings from the particular data source with distinguished listing data from a distinguished data source; and
- rank the data sources of the plurality of data sources based on the determined accuracy rate of each different data source.

16. The computer program product of claim 15, wherein the set of listings are selected based on a geographic proximity of each listing in the set of listings to a geographic location of the item.

17. The computer program product of claim 14 further comprising computer instructions for:
- when the indication of reliability of the first data source is greater than the indication of reliability of the second data source, replacing values of all fields of the listing data for the item received from the second data source with values of the corresponding data fields of the listing data for the item received from the first data source; and
- when the indication of reliability of the second data source is greater than the indication of reliability of the first data source, replacing values of all fields of the listing data for the item received from the first data source with values of the corresponding data fields of the listing data for the item received from the second data source.

18. The computer program product of claim 14 further comprising computer instructions for:
- comparing values of a particular set of data fields in listing data received from the particular data source with values of the particular set of data fields in corresponding listing data received from a distinguished data source; and
- updating an indication of reliability of the particular data source based on the comparison.

19. A system for resolving a discrepancy between different data sources, comprising:
- a processor configured to:
  - receiving, from a plurality of different data sources, listing data for, wherein the listing data from the plurality of different data sources comprises listing data for the same, and wherein the listing data for each data source among the plurality of data sources comprises values for one or more data fields;
  - comparing values of a first set of data fields in the listing data received from a first data source among the plurality of data sources with values of the first set of data fields in the listing data received from a second data source among the plurality of data sources for the item;
  - determining whether there is a discrepancy between the listing data received from the first data source and the listing data received from the second data source;
  - when there is a discrepancy between the listing data received from the first data source and the listing data received from the second data source, resolving the discrepancy between the listing data for the item received from the first data source and the listing data for the item received from the second data source by:
    - determining an indication of reliability of the first data source;
    - determining an indication of reliability of the second data source;

identifying a set of data fields whose values are different between the listing data received from the first data source and the listing data received from the second data source;

for each particular data field in the set of data fields whose values are different:

comparing the indication of reliability of the first data source with the indication of reliability of the second data source;

when the indication of reliability of the first data source is greater than the indication of reliability of the second data source, replacing a value of the particular field of the listing data for the item received from the second data source with a conflicting value of the particular data field of the listing data for the item received from the first data source; and when the indication of reliability of the second data source is greater than the indication of reliability of the first data source, replacing a value of the particular field of the listing data for the item received from the first data source with a conflicting value of the particular data field of the listing data for the item received from the second data source; and a memory coupled to the processor and configured to provide the processor with instructions.

20. The system of claim 19, wherein indications of reliability of data sources of the plurality of data sources are based on reliability ratings of the data sources, wherein the reliability ratings of the data sources are determined at least in part by:

for each particular data source of at least a subset of the plurality of data sources:

process listing data of a set of listings from the particular data source;

determine an accuracy rate for the particular data source by comparing the listing data of a subset of the set of listings from the particular data source with distinguished listing data from a distinguished data source; and rank the data sources of the plurality of data sources based on the determined accuracy rate of each different data source, wherein the set of listings are selected based on a geographic proximity of each listing in the set of listings to a geographic location of the item.

* * * * *

UNITED STATES PATENT AND TRADEMARK OFFICE
CERTIFICATE OF CORRECTION

PATENT NO. : 10,872,100 B1  
APPLICATION NO. : 16/102333  
DATED : December 22, 2020  
INVENTOR(S) : Shefferman et al.

Page 1 of 1

It is certified that error appears in the above-identified patent and that said Letters Patent is hereby corrected as shown below:

In the Drawings

On sheet 4 of 8, in Figure 4, reference numeral 404, Line 1, delete "Determinine" and insert -- Determine --, therefor.

On sheet 8 of 8, in Figure 8, reference numeral 806, Line 1, delete "Determinine" and insert -- Determine --, therefor.

In the Specification

In Column 3, Line 57, delete "system)" and insert -- system). --, therefor.

In the Claims

In Column 9, Line 18, in Claim 1, after "reliability" delete "for".

In Column 9, Line 21, in Claim 1, after "reliability" delete "for".

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*